United States Patent [19]

Hymore et al.

[11] Patent Number: 4,496,386
[45] Date of Patent: Jan. 29, 1985

[54] METHOD OF AND APPARATUS FOR BENDING GLASS SHEETS

[75] Inventors: Frank J. Hymore, Oregon, Ohio; Paul H. Kreinbrink, Temperance, Mich.

[73] Assignee: Libbey-Owens-Ford Company, Toledo, Ohio

[21] Appl. No.: 570,792

[22] Filed: Jan. 16, 1984

[51] Int. Cl.³ ............................................. C03B 23/023
[52] U.S. Cl. ................................ 65/106; 65/104; 65/273; 65/287; 65/291
[58] Field of Search ............... 65/104, 106, 107, 273, 65/287, 291

[56] References Cited

U.S. PATENT DOCUMENTS 4,305,746 12/1981 Hagedorn et al. ................. 65/106
4,312,661 1/1982 Hagedorn et al. ................. 65/291 X
4,396,410 8/1983 Hagedorn et al. ................. 65/106

Primary Examiner—Arthur Kellogg
Attorney, Agent, or Firm—Phillip S. Oberlin

[57] ABSTRACT

A method of and apparatus for press bending sheets into complex shapes wherein the apparatus includes at least one press member of outline or ring-type construction having an array of spaced apart shaping rail elements mounted in a composite array and adapted to pass upwardly between adjacent conveying rolls to contact and support the undersurface of a sheet of heat-softened glass. Another array of shaping rail extensions is disposed above the conveying rolls mounted for movement into and out of association with the spaces between the spaced apart shaping rail elements of the first mentioned array.

12 Claims, 8 Drawing Figures

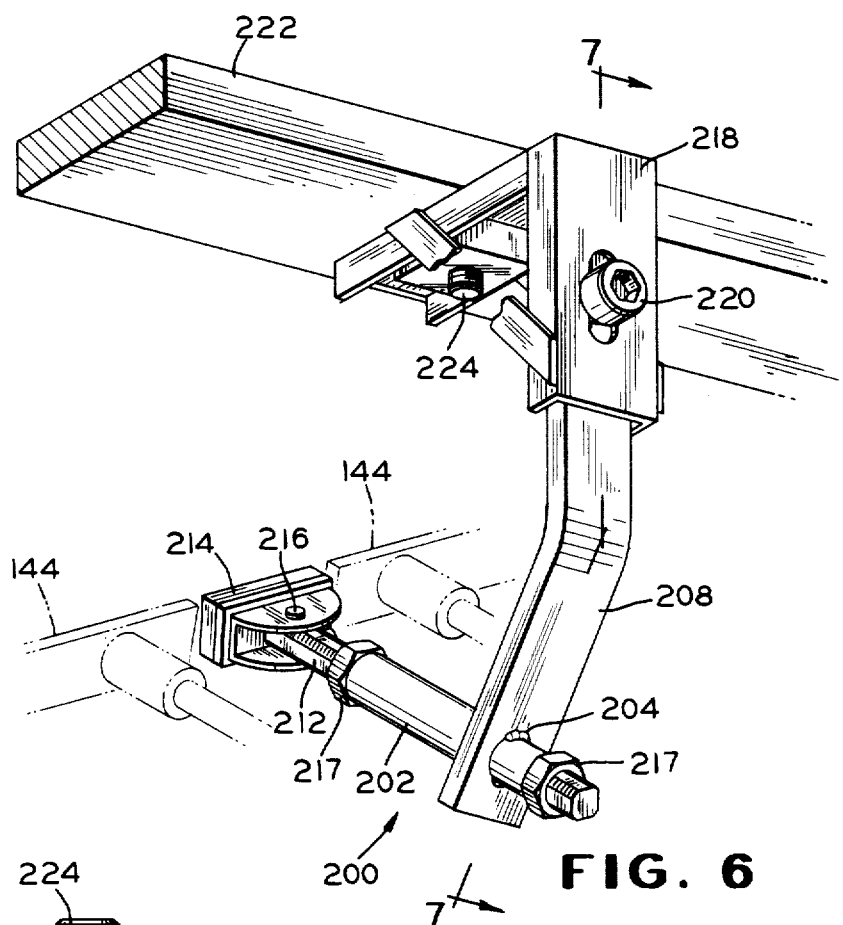
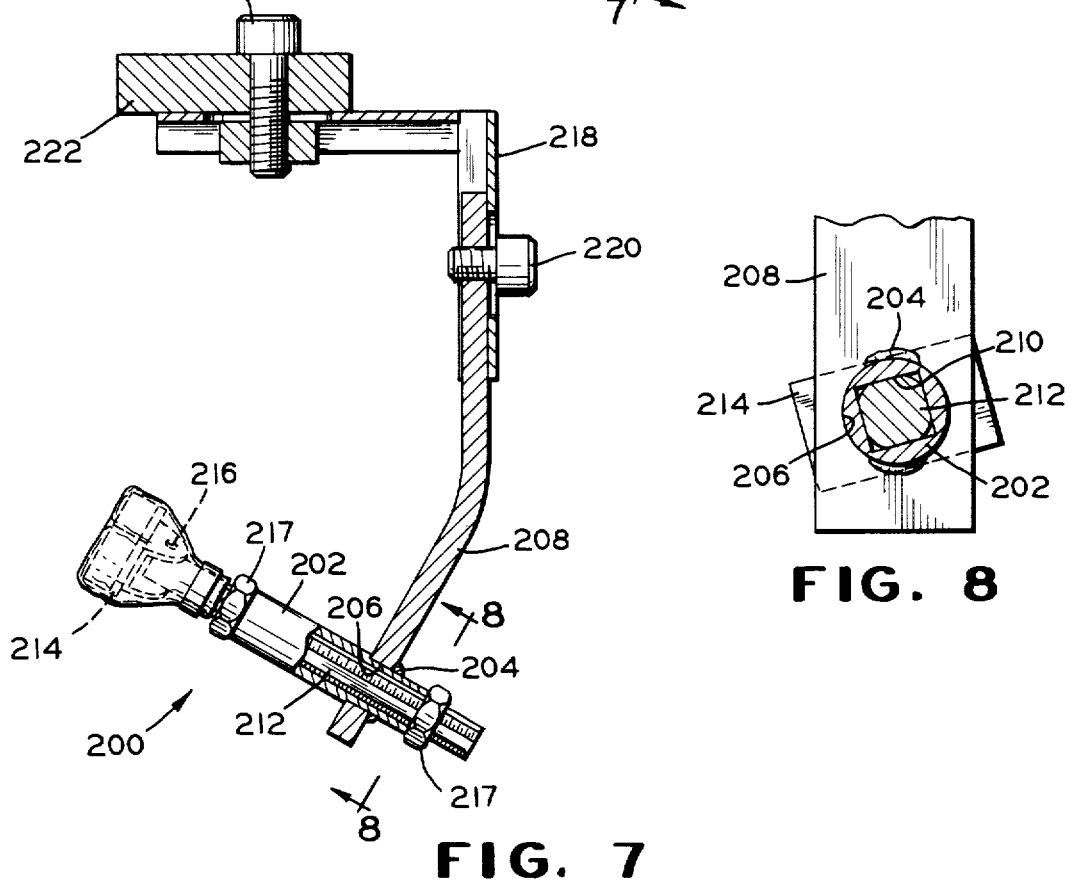
FIG. 6
FIG. 7
FIG. 8

METHOD OF AND APPARATUS FOR BENDING GLASS SHEETS

BACKGROUND OF THE INVENTION

The present invention relates generally to the production of bent glass sheets and, more particularly to an improved method and apparatus for bending specifically configurated glass sheets.

Bent sheets of glass are commonly used as glazing closures in vehicles such as automobiles and the like. It is often desirable to shape or form the glass in a manner to carry out styling features found in the adjacent sheet metal components in order to create the appearance of unity between the glass and the sheet metal. For example, in a recent proposed design, it is desirable to provide an automotive backlight having inturned side portions extending into the side surfaces of the vehicle and into the roof line of the vehicle as well as the deck lid, respectively. The press bending apparatus of the type required to achieve such shapes typically employs a structure wherein the female member of the mold set is in the form of a ring having a portion thereof segmented to permit passage of the ring upwardly through an associated array of conveying rolls during the bending operation as illustrated and described in United States Pat. No. 4,305,746 entitled "Method of and Apparatus for Bending Glass Sheets", Floyd T. Hagedorn et al, issued Dec. 15, 1981. In certain instances, the discontinuities in the female ring has caused slight ripple effects in the edges of the glass sheet being formed.

SUMMARY OF THE INVENTION

It is an object of the present invention to produce an improved method and apparatus for bending glass sheets into complex shapes and assuring a smooth uninterrupted edge portion in the final formed product.

Another object of the invention is to produce in the foregoing method and apparatus an arrangement for bending a glass sheet toward its ultimately desired configuration and, at all times, assuring an uninterrupted smooth edge portion in the formed glass sheet.

Still another object of the present invention is to produce a press apparatus retaining the advantages found in the modified outline-type press member of U.S. Pat. No. 4,305,746, in combination with other features to effect the desired complex shape in a heated glass sheet. It is a further object of this invention to combine with the foregoing press apparatus elements which are selectively moveable into the spaces between the segmented ring portions prior to the final bending of the associated glass sheet.

The foregoing and other objects, advantages, and features of the present invention will become readily apparent to one skilled in the art from considering the following detailed description of a preferred embodiment of the invention when considered in the light of the accompanying drawings wherein like reference numerals denote like parts throughout the various views.

BRIEF DESCRIPTION OF THE DRAWINGS

FIG. 6 is an enlarged fragmentary perspective view of one of the interdigitating rail extensions and supporting mechanism of the invention;

FIG. 7 is a sectional view of the mechanism illustrated in FIG. 6 taken along line 7—7 thereof; and FIG. 8 is a sectional view taken along line 8—8 of FIG. 7.

DESCRIPTION OF THE PREFERRED EMBODIMENT

Figure 1:
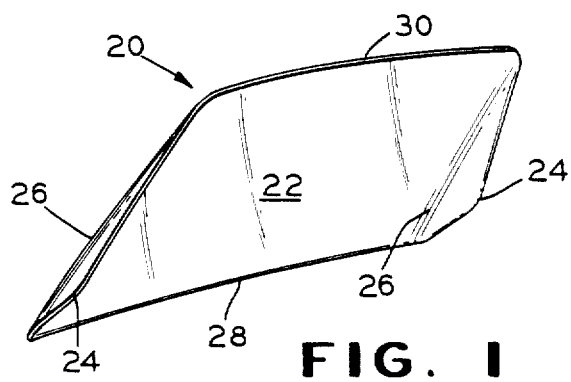
FIG. 1 is a perspective view of a specially configurated glazing closure produced in accordance with the method and apparatus of this invention.

Referring now in detail to the illustrative embodiment depicted in the accompanying drawings, there is illustrated in FIG. 1 a glazing closure 20 bent to the desired configuration in accordance with the method and apparatus of this invention and which is intended for use as a backlight in an automotive design embodying new styling features. The backlight 20 is comprised of a monolithic glass sheet having a central body portion 22 and inturned opposited end or side portions 24 bent at relatively sharp or abrupt angles about axes 26 which extend from one longitudinal edge 28 toward the other longitudinal edge 30 and terminate inwardly of the latter. The upper marginal edge 30 of the backlight 20 is adapted to extend into the roofline of the vehicle when installed, while the lower marginal edge 28 extends into the deck lid and forms a part thereof to create the appearance of unity between the glass and the sheet metal of the vehicle body. As used herein, the terms upper, lower, top, bottom, horizontal, vertical, and the like are applied only for convenience of description with reference to the drawings and should not be taken as limiting the scope of this invention. While it will be convenient to describe the method and apparatus of this invention in connection with the shaping of a single glass sheet having sharp inturned edge portions and a crosswise curvature, it whould be understood the principles of this invention are equally adaptable in the production of glass sheets having bent curvatures in any direction and/or multiple layered sheets of glass, such as conventional laminated windshields, for example.

Figure 2:
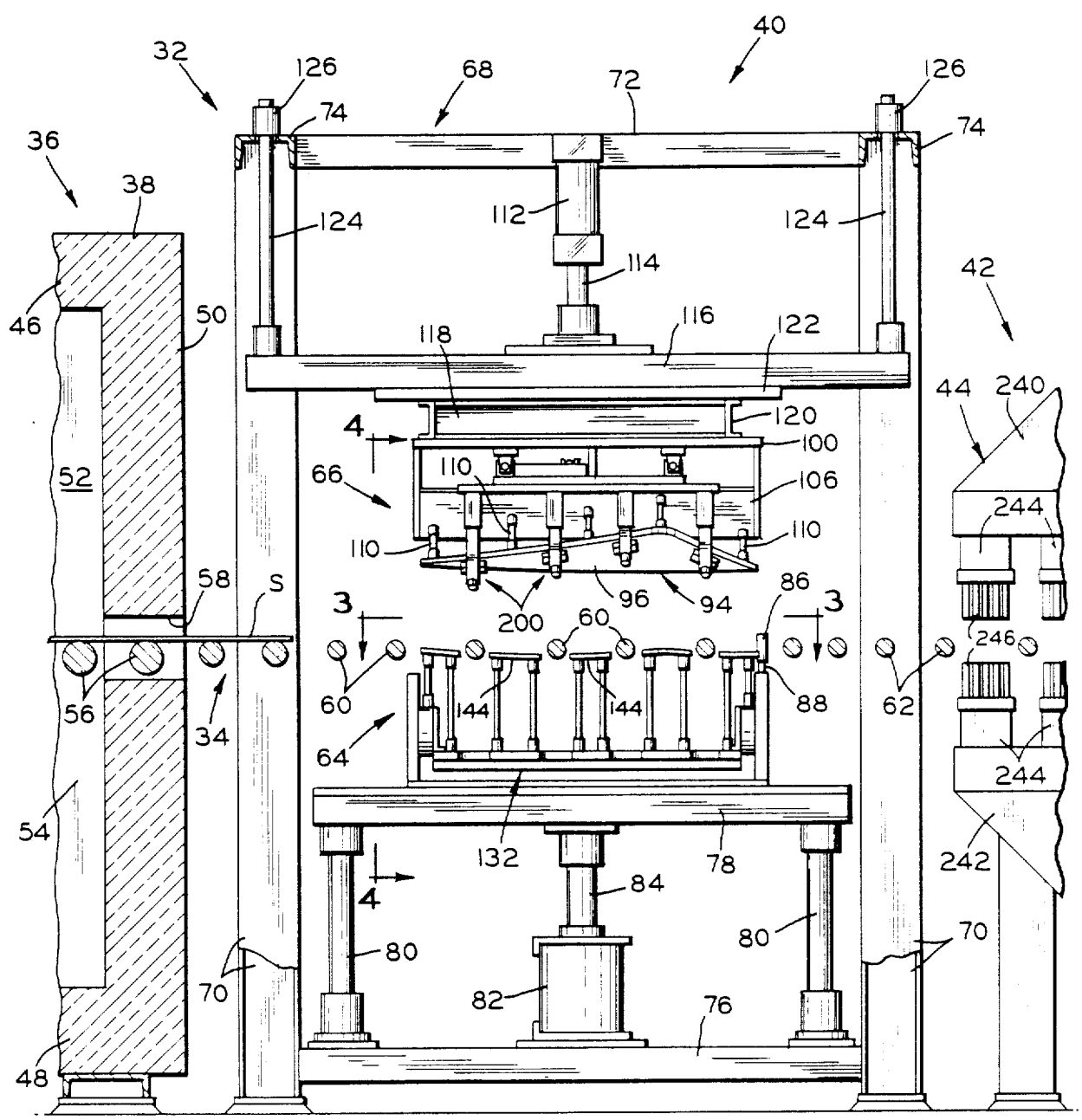
FIG. 2 is a side elevational view, partly in section, of a bending apparatus employing the novel features of this invention and shown interposed between a heating and a tempering station.

Referring now in detail to the illustrative embodiment for carrying out this invention, there is shown in FIG. 2 an improved bending apparatus constructed in accordance with this invention and hereinafter more fully described, embodied in a horizontal glass sheet bending and tempering apparatus, comprehensively designated by reference numeral 32. The apparatus 32 includes a continuous conveyor system 34 adapted to support a plurality of sheets S for movement in a generally horizontal path through a heating station 36 having a furnace 38 for heating the sheets to the softening point or bending temperatures, a bending station 40 embodying the novel apparatus of this invention for bending the heated sheets S to the desired complex, irregular shape, and a tempering station 42 having chilling means 44 for rapidly reducing the temperature of the bent sheets to produce the desired temper therein.

In the illustrative embodiment, the glass sheets S are heated in the furnace 38, which is of the tunnel-type having a top wall 46, a bottom wall 48, a rear end wall 50, and opposite side walls 52, all formed of a suitable refractory material and defining a heating chamber 54. The heating chamber 54 can be heated in any desired manner by suitable heating means, such as gas burners or electric resistance elements, for example (not shown) located in the top and side walls of the furnace. Such heating means are suitably controlled by apparatus, not shown, to obtain the desired temperature in the various zones within the heating chamber 54. The sheets S are carried through the heaating chamber 54 of the furnace 38 on a series of conveyor rolls 56 forming a part of the conveyor system 34 and extending transversely across the chamber 54 with their opposite ends projecting through the opposite walls 52 and suitably journaled in bearing blocks (not shown) located exteriorally and along side the walls 52 of the furnace 38.

A plurality of glass sheets S are individually loaded on and supported in a generally horizontal plane on the longitudinally spaced conveyor rolls 56 at the entrance end of the furnace (not shown) and heated in a controlled manner to the desired bending temperature during te passage therethrough. Upon emerging through an opening 58 in the rear end wall 50 of the furnace 38, the heated glass sheets S are transferred from the conveyor rolls 56 onto a second series of spaced conveyor rolls 60 located in the bending section 40 and which also form a part of the conveying system 34. The series of rolls 60 support the glass sheets S horizontally for movement into and within the bending station 40 above the lower press member prior to final shaping by the press members hereinafter described in detail. The rolls 60 receive the bent sheets after final bending to convey them to the tempering station 42, where they are received upon a series of conveyor rolls 62 and carried thereby through the tempering station 42.

In accordance with this invention, the bending apparatus 40 includes a moveable lower press member 64 and an upper press member 66, both suitably mounted within a rigid framework 68, which includes two substantially vertical columns 70 located on each side of the conveyor system and spaced longitudinally therealong with the columns of the opposite sides of the conveyor being laterally aligned. The columns 70 extend upward above the upper press member 66 and are tied together structurally at their upper ends by horizontal beams 72 and 74 extending longitudinally and transversely of the conveyor, respectively, and secured at their opposite ends to the aligned columns 70 to form a rigid box-like structure. A base member 76 extends between the upright columns 70 for supporting the lower press member 64 and associated parts thereof. The upper press member 66 is mounted above the conveyor rolls 60, while the lower press member 64 is located below the conveyor rolls 60 and mounted on a carriage 78 for vertical reciprocal movement toward and away from the press member 66.

The carriage 78 is supported by guide members 80 and vertically moveable by a fluid actuated motor or actuator 82 mounted on the base member 76 and having a suitable piston rod 84 for raising and lowering the press member 64 between a lower position beneath the conveyor and an upper position thereabove for lifting a heat-softened glass sheet S from the conveyor rolls 60 and pressing the same against the upper press member 66 into the desired shape. After bending, the piston rod 84 is retracted to lower the press member 64 below the conveyor rolls 60, depositing the bent sheet thereon for advancement into the tempering station 42.

A pair of laterally spaced locator stops 86 are typically positioned in the path of movement of the advancing glass sheets to interrupt movement thereof and accurately position the same in the desired location relative to the lower press member 64. Each stop 86 is secured to the distal end of a piston rod 88 of a fluid actuated motor or actuating cylinder 90 mounted on the carriage 78. The cylinders 90 are operative to raise and lower the stops 86 between an upper position above the conveyor rolls 60 in the path of movement of the glass sheets S and a lower position therebeneath.

Figure 4:
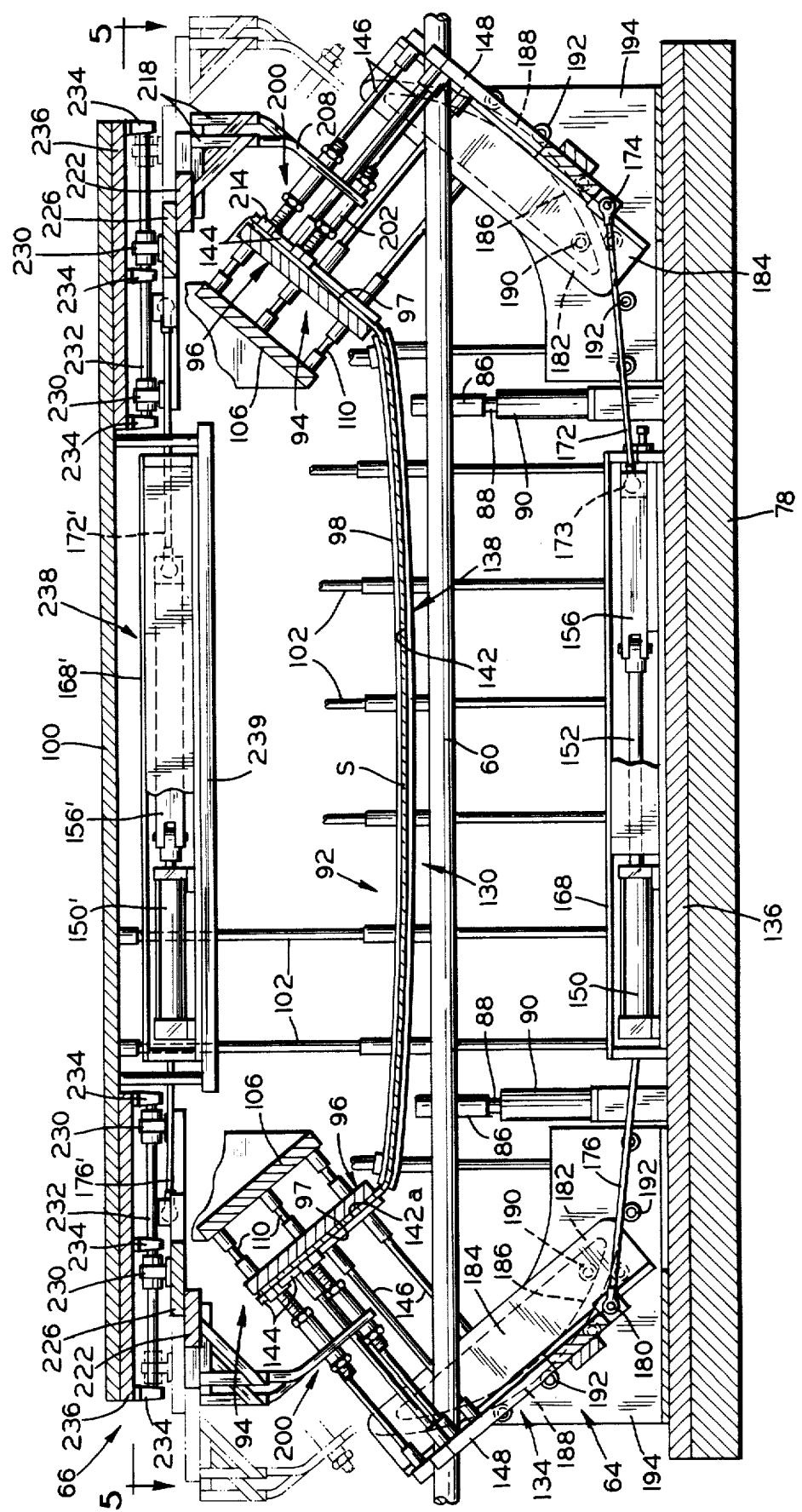
FIG. 4 is a vertical sectional view, on an enlarged scale, taken along line 4—4 of FIG. 2.
Figure 5:
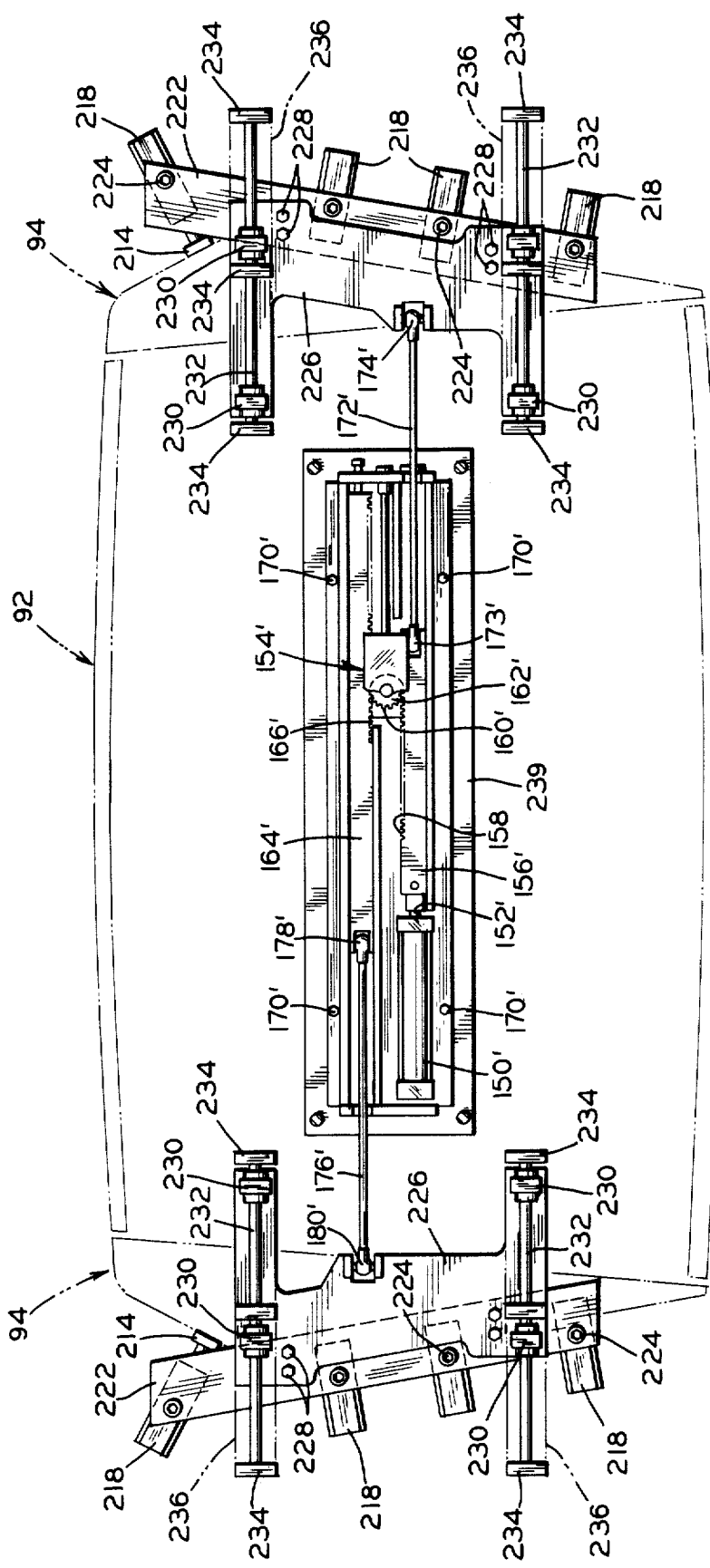
FIG. 5 is a top plan view taken generally along line 5—5 of FIG. 4 with parts broken away to illustrate the actuating means for moving an array of shaping rail extensions into and out of interdigitated position in respect of certain of the shaping rails of a first array.

The upper press member 66 is formed with a central body portion 92 and end portions 94 comprised of shaping elements 96, as clearly illustrated in FIG. 4. The central body portion 92 is of outline or ring-type construction and comprises spaced shaping rails 98 connected to a base member 100 by a plurality of connecting rods 102. The shaping rails 98 conform in outline to the central body portion 22 of the glass sheet to be bent and are provided with downwardly directed, shaping surfaces to impart the desired curvature to the sheets. Of course, the particular outline of the shaping rails 98, as well as the specific curvature of the shaping surfaces, is dictated by the desired finished shaped of the central body portion of the sheet being bent and can vary, as desired. Also, in lieu of an outline ring-type shaping surface, the upper press member 66 can have a continuous or partially continuous shaping surface, if desired.

The shaping elements 96 have outline configurations conforming to the outside dimension of the side portions 24 of the backlight 20 (FIG. 1) and continuous shaping surfaces 97 complimentary to the shape adapted to be imparted to the side portions 24 of the backlight 20. Each shaping element 96 is suspended from a plate 106 affixed to a base member 100, by a series of connecting members 110. The connecting members 110 are typically axially adjustable by suitable threadable connections. The adjustability of the threaded connecting rods 110 and a pivotal linkage attached thereto, if required, render the shaping element 96 adjustable to accommodate glass sheet side portions bent to various angular attitudes.

The means for supporting the upper press member 66 on the frame 68 includes at least one actuating cylinder 112 mounted on one of the upper horizontal beams 72 and having a suitable reciprocal piston (not shown) provided with a piston rod 114 connected at its outer end to a vertically reciprocal platen frame 116. The base member 100 of the upper press member 66 is connected to the platen frame 116 for movement therewith by means of a supporting structure including interconnected structural members 118 and 120 sandwiched between support plates 122 and 100. A plurality of guideposts 124 are connected at their lower ends to the four corners of the platen frame 116, respectively, and extend upwardly through suitable bushings 126 mounted on the upper horizontal beams 74 for sliding movement relative thereto to properly guide the platen frame 116 during its vertical reciprocal movement.

Figure 3:
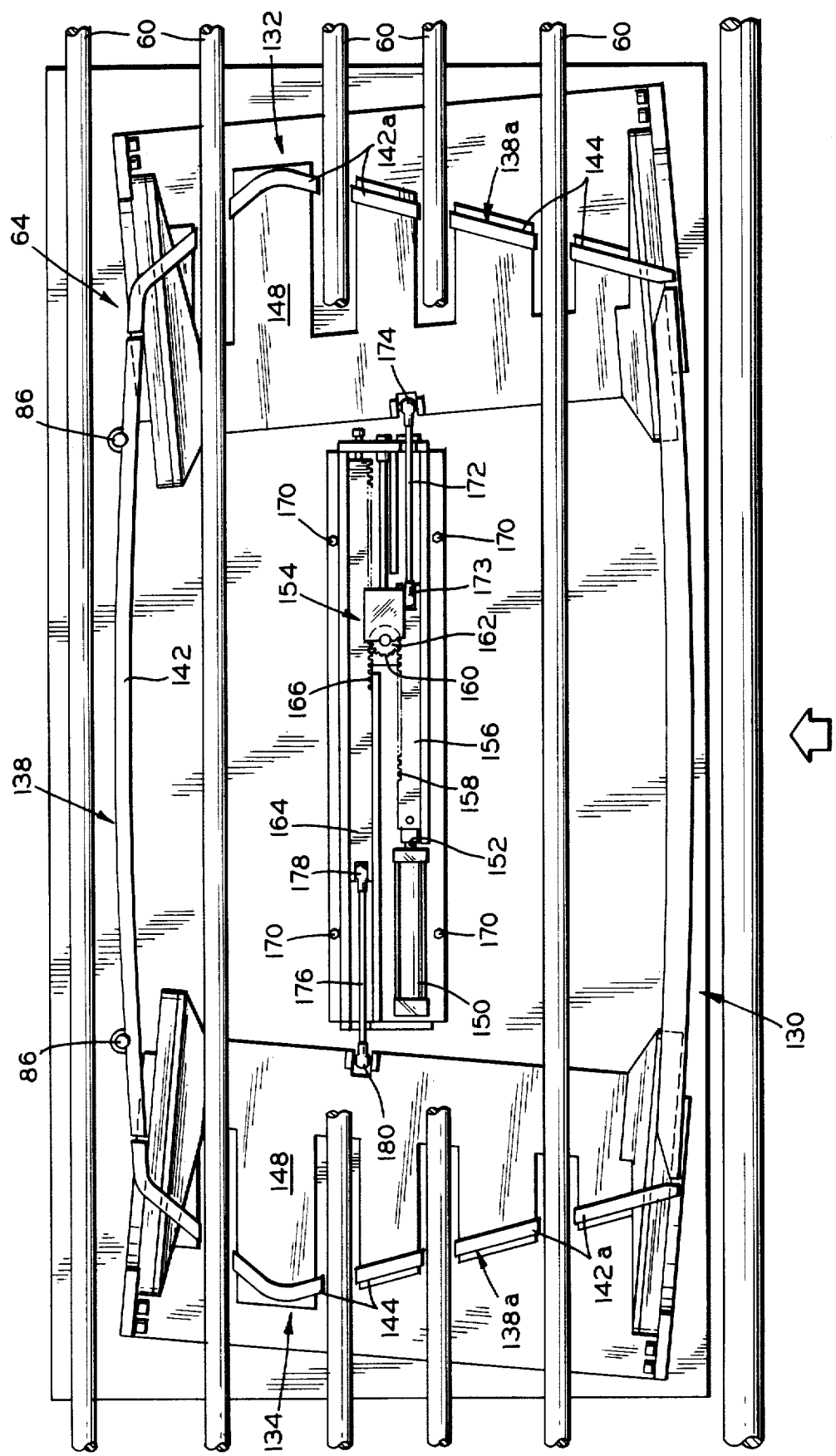
FIG. 3 is a horizontal sectional view through the bending section taken along line 3—3 of FIG. 2, and showing one form of a lower press member and conveyor roll arrangement in plan.

Referring to FIGS. 3 and 4, the lower press member 64 comprises a central, main body section 130, and a pair of opposite, articulated end sections 132 and 134 mounted for pivotal movement relative to the main body section 130 between a lower glass receiving position and an upper press bending position. The main body section 130 comprises a base plate 136 secured to the carriage 78 and a shapring rail 138 connected to the base plate 136 in spaced relation thereto via a series of connecting rods 140. The shaping rail 138 connforms to the width of the glass sheets to be bent and is provided on its upper face with a generally concave shaping surface 142.

The press end sections 132 and 134 are substantially identical and mirror images of each other, and each comprises a shaping rail 139a having an upper shaping surface 142a forming a continuation of the shaping surface 142 of the main body section 130. The shaping rails 138 and 138a cooperate to conform in outline to the peripheral outline of the glass sheets to be bent. To permit displacement of the shaping rails 138a above the level of the conveyor rolls 60 for lifting the glass sheets S thereabove in effecting the desired bend, shaping rails 138a are formed of a plurality of segments 144 (FIG. 3) extending generally transversely of the conveyor rolls 60 and spaced apart from each other a sufficient distance to pass between adjacent rolls 60 when raised and lowered. The rolls 60 are formed of a smaller diameter than the series of rolls 56 for the purpose of providing maximum clearance between the rolls 60 for the passage of the segments 144 therethrough.

The segments 144 constituting a shaping rail 142a are connected, via suitable connecting rods 146, to a moveable base plate 148 and the parts formed thereon. The plates 148 are mounted for swinging movement in arcuate paths toward each other relative to the main frame section 130 by means of a single fluid cylinder 150 operatively connected to a rack and pinion assembly in turn connected to the base plates 148 of the end sections 132 and 134 to effect concurrent and equal pivotal movement thereof. The cylinder 150 is provided with the usual reciprocal piston (not shown) having a piston rod 152 extending axially outwardly therefrom and operatively connected to a mechanical transmission means in the form of a dual rack and pinion assembly, generally designated by reference numeral 154. The rack and pinion assembly 154 includes a gear rack 156 suitably rigidly connected to the outer end of the piston rod 152. The gear rack 156 is provided with suitable teeth 158 engaging and meshing with the peripheral teeth 160 formed on the cylindrical body of a pinion gear 162. A second gear rack 164, disposed in an opposed, spaced, parallel relation with the gear rack 156, is formed with teeth 166 engaging and meshing with the teeth 160 of the pinion gear 162. The actuating assembly is typically enclosed within a housing 168 suitably mounted on the base plate 136 as by threaded fasteners 170, for example. The distal end of the gear rack 156 is connected to one end of a connecting rod 172 by means of a universal joint 173. The other end of the connecting rod 172 is coupled to the base plate 148 of the pivotally mounted end section 132 by means of a suitable univeral joint 174.

In a simmilar, but opposite arrangement, one end of the gear rack 164 is coupled to one end of a connecting rod 176 by means of a universal joint 178. The opposite end of the connecting rod 176 is coupled to the base plate 148 of the pivotally mounted end section 134 by means of a suitable universal joint 180. The above described rack and pinion mechanism is illustrated and described in greater detail in U.S. Pat. No. 4,312,661 entitled "Apparatus for Bending Glass Sheets," Hagedorn et al, issued Jan. 26, 1982.

Means are provided for guiding the press end sections 132 and 134 in their arcuate movements. Such guide means include a cam track 182 rigidly secured to an upright bracket 184 affixed to each side of the moveable base plate 148. As best shown in FIG. 4, each cam track 182 is formed with an inner cam surface 186 and an outer cam surface 188 adopted to ride on an inner roller 190 and a series of outer rollers 192, respectively, journaled for rotation in an upright mounting plate 194 located ajdacent to and outwardly of the associated bracket 184.

It has been found that the apparatus previously described functions satisfactorily in forming glass sheets wherein the final formed article does not incorporate severe bending configurations. In forming articles having severe bends, it was found to be advantageous to employ mechanism to selectively fill the spaces or gaps between the segments 144 of the female shaping rail 138a of the lower press member 64 at the time the final bending occurred.

The apparatus for achieving this objective includes a plurality of finger assemblies 200. Each of the finger assemblies 200, as illustrated in FIGS. 6, 7, and 8, is comprised of a shaft 202 secured as by a welding bead 204, for example, within a suitable aperture 206 in the depending end portion of supporting arm 208. The shaft 202 is provided with a bore 210 of rectangular or flat sided configuration extending therethrough for axially receiving a complementally shaped, externally threaded shank 212. A shaping rail extension 214 is pivotally mouned at one end of the shank 212 by means of a pivot pin 216 which permits limited relative pivotal movement between the extension 214 and the shank 212. The desired orientation of the rail extension 214 with respect to the supporting arm 208 is maintained by the proper positioning of the shaft 202 and its cooperating shank 212 within the aperture 206 prior to welding. Relative axial movement of the shank 212 and the hollow shaft 202 is effected by a pair of cooperating threaded fasteners 217 adapted to be received by the external threaded portion of the shank 212. By cooperative adjustment of the fasteners 217, the shank 212 may be readily moved axially of the shaft 202 to a variety of fixed relative positions.

The rail extensions 214 are typically formed of a composite layered construction to impart the desired characteristics to that portion of the extension which is desired to be engageable with the glass sheet being bent. The typical construction may be formed of a suitable, non-abrasive, heat resistant material, such as fiberglass cloth, for example, to provide a smooth surface to the heat-softened glass sheet and a somewhat resiliently yieldable cushion between the glass sheet and the surface of the extension to militate against marring of the contacting glass surface.

The upper end of the arm 208 is slidably affixed to a bracket 218 by a threaded fastener 220 to allow limited vertical positioning movement of the arm 206 with respect the bracket 218. The bracket 218 is, in turn, suitably secured to a supporting beam 222 by a threaded fastener 224. It will be noted that the bracket 218 is provided with slotted apertures for receiving the shank portions of the fasteners 220 and 224, respectively, to permit the desired adjustment between the bracket 218 and the associated arm 208 and beam 222.

The beam 222 is affixed to the undersurface of a plate member 226 by means of suitable threaded fasteners 228. The plate member 226 is supported by bearing members 230 which are adapted to be slidingly supported on a pair of spaced apart, parallel guide shafts 232.

The guide shafts 232 are, in turn, supported by a series of brackets 234 which depend from a shaft supporting plate 236 secured to the undersurface of the base member 100.

The supporting beam 222 is caused to be moved horizontally by a rack and pinion assembly 238 the mechanisms of which is identical in all structural and operational aspects to the rack and pinion assembly 154 employed to effect movement of the articulated end sections 132 and 134 of the lower press member 64. Accordingly, similar primed reference numerals will be used in describing the structure. More specifically, the support beams 222 and the associated finger assemblies 200 for each side of the overall apparatus are mounted for to and fro movement in horizontal paths toward and away from each other by means of a single fluid cylinder 150' operatively connected to a rack and pinion assembly in turn connected to the beams 222 of the supporting plates 226 to effect concurrent and equal horizontal movement thereof. The cylinder 150' is provided with the usual reciprocal piston (not shown) having a piston rod 152' extending axially outwardly therefrom and operatively connected to a mechanical transmission means in the form of a dual rack and pinion assembly, generally designated by reference numeral 154'. The rack and pinion assembly 154' includes a gear rack 156' suitably rigidly connected to the outer end of the piston rod 152'. The gear rack 156' is provided with suitable teeth 158' engaging and meshing with the peripheral teeth 160' formed on the cylindrical body of a pinion gear 162'. A second gear rack 164', disposed in an opposed, spaced parallel relation with the gear rack 156', is formed with teeth 166' engaging and meshing with the teeth 160' of the pinion gear 162'. The actuating assembly is typically enclosed within a housing 168' suitably mounted on a base plate 239 as by threaded fasteners 170', for example. The distal end of the gear rack 156' is connected to one end of a connecting rod 172' by means of a universal joint 173'. The other end of the connecting rod 172' is coupled to the supporting plate 226 by means of a suitable universal joint 174'.

In a similar, but opposite arrangement, one end of the gear rack 164' is coupled to one end of a connecting rod 176' by means of a universal joint 178'. The opposite end of the connecting rod 176' is coupled to the opposite supporting plate 226 by means of a suitable universal joint 180'. The above described rack and pinion mechanism is illustrated and described in greater detail in U.S. Pat. No. 4,312,661 entiled "Apparatus for Bending Glass Sheets," Hagedorn et al, issued Jan. 26, 1982.

The mode of operation of the apparatus of this form of the invention in bending one sheet of glass is as follows:

A flat glass sheet S is loaded onto the conveyor rolls 56 at the entrance end (not shown) of the furnace 38 for movement through the heating chamber 54 wherein the sheet is heated throughout to substantially its softening point or bending temperature. The heated sheet then passes through the opening 58 and is transferred onto the conveyor rolls 60, which are positioned in a generally common horizontal plane for properly supporting the heated glass sheets being conveyed thereby.

As the sheet S enters the bending section 40, a photoelectric cell (not shown), or other suitable detection device, senses the entry of the glass sheet into the bending station 40 for initiating a bending cycle for energizing a timing mechanism which controls the actions of the press actuating cylinder 82, and the stop cylinders 90. The timing mechanisms are so designed that the lower press member 64 begins its ascent by actuation of the cylinder 82 and engages the glass sheet at about the moment the leading edge thereof engages the locator stops 86. Next, the shaping surfaces 142, 142a of the rails 138, 138a engage the glass sheet.

As the lower press member 64 continues to move upwardly, the combined effects of inertial and gravitational forces cause the glass sheet to sag into conformity with the shaping surfaces 142, 142a of the press member 64. The press member 64 continues upwardly until it reaches the end of its upstroke or the "upper dwell" position, pressing the glass sheet between the opposed rail shaping surfaces of the upper and lower press members 66 and 64, respectively, to impart the desired configuration to the glass sheet S. During the upstroke of the press member 64, the cylinders 90 are actuated to retract the locator stops 86 and permit advancement of the bent sheet when subsequently returned to the conveyor roll 60.

When the lower press member 64 reaches this abovementioned "upper dwell" position, it also engages a suitable limit switch (not shown) to initiate operation of the cylinders 150, 150' for extending the associated piston rods 152, 152' to swing the articulated press end sections 132 and 134 upwardly to sharply bend the glass end portions and press the same against the shaping surface 97 of the shaping elements 96; and simultaneously initiates the movement of the beams 222 and the associated arrays of finger assemblies 200 to cause the shaping rail extensions 212 to be moved into interdigitated position between the spaced apart rail segments 144 of the articulated end sections 132 and 134 thereby presenting to the peripheral portion of the undersurface of the ends of the glass sheet S being formed a substantially uninterrupted forming ring. The cooperative operation thereby forms the sheet S into its final desired shape.

After the glass sheet S has been shaped into its final configuration between the press members 64 and 66, the press member 64 is lowered, the finger assemblies 200 are retracted horizontally, and the articulated end sections 132 and 134 are swung downwardly and returned to their lowermost generally horizontal dispositions. The lower press member 64 is then lowered below the conveyor roll 60 to effectively cause deposition of the bent glass sheet thereon for advancement out of the bending station 40. The bent sheet is then advanced along the supporting surface at the proper rate of speed out of the bending section 40 and onto the conveyor rolls 62 for advancement into and through the adjacent tempering station 42. When the trailing edge of the bent sheet leaves the last conveyor roll 60 in the bending station 40, the cylinders 150, 150' are extended in preparation for the next bending cycle to move the articulated end sections 132 and 134 from their lowermost positions to glass receiving positions—positions intermediate their uppermost bending positions and lowermost positions and in which positions the sections 132 and 134 engage the flat glass sheet upon elevation of the press member 64.

The chilling means 44 in the tempering station 42 includes upper and lower blastheads 240 and 242 disposed above and below the path of movement of the glass sheet S and connected to a suitable source (not shown) of cooling fluid, such as air, for example. The blastheads 240 and 242 are provided with a plurality of transversely extending sections 244, each of which is formed with a plenum chamber having a plurality of tubes 246 for discharing streams of cooling air against the opposite surfaces of the bent sheets moving along the path on the conveyor rolls 62. The bent sheets are advanced between the blastheads 240 and 242 at a speed promoting a proper rate of cooling to obtain a quality temper in the sheets.

Actuation of cylinders 82, 90, 150, and 150′ is effected by conventional fluid control valves (not shown). Proper sequencing of the operation of the several control valves, as well as variation in the speed imparted to the several series of conveyor rolls 56, 60, and 62, for effecting the foregoing operations in a cyclic, timed relationship is effected by conventional limit switches and/or by conventional timers incorporated in the electrical control system (not shown). Each of these switches and/or timers triggers subsequent stages of operation of the various actuators and conveyor roll drives and since such sequentially operable switches and timing arrangements are known and, per se, form no part of the present invention, no detailed description or further amplification is believed to be necessary.

From the foregoing, it is apparent that the objects of this invention have been fully accomplished. As a result of this invention, an improved method and apparatus is produced for bending glass sheets in a mass production operation to produce heretofore unobtainable complex shapes. It is to be understood that the form of the invention herein illustrated and described is to be taken as an illustrative embodiment, and that various changes in shape, size, and arrangement of parts, as well as various procedural changes, may be resorted to without departing from the spirit of the invention.

We claim:

1. A method of bending a glass sheet comprising the steps of:
   heating a glass sheet to the softening point thereof;
   conveying the heated glass sheet on a series of spaced apart conveyor rolls along a path positoned in spaced relation to a press member including a shaping rail corresponding to the marginal outline of the heated glass sheet, and having interruptions therein to permit passage of the press member upwardly through the conveyor rolls, and an array of shaping rail extensions adapted to substantially fill at least a portion of the interruptions of the shaping rail;
   moving the shaping rail of the press member along a path generally normall to and through the conveyor rolls; and
   moving the array of shaping rail extensions relative to the interruptions of the shaping rail to substantially fill at least a portion of the interruptions of the shaping rail to effect a bending of the glass sheet to impart a final desired shape to the glass sheet.

2. The method according to claim 1 wherein the step of moving the shaping rail of the press member includes moving the shaping rail upwardly through the conveyor rolls and thence moving the shaping rail downwardly through the conveyor rolls permitting the conveyor rolls to support the final shaped glass sheet.

3. The method according to claim 2 including the step of advancing the final shaped glass sheet upon the conveyor rolls to a tempering station.

4. Apparatus for bending a glass sheet comprising:
   a plurality of spaced apart conveyor rolls for moving a heat softened glass sheet along a path;
   a movable bending member including an outline shaping rail provided with a shaping surface conforming to the marginal outline of the glass sheet to be bent, at least a portion of the rail being interrupted to permit passage of said member upwardly through said conveyor rolls;
   an auxiliary array of shaping rail extensions adapted to substantially fill at least a portion of the interruptions of the outline shaping rail of said bending member above said conveyor rolls;
   means for moving said bending member and the associated shaping surfaces along a path normal to and through said conveyor rolls; and
   means for moving said array of shaping rail extensions relative to the interruptions of the outline shaping rail to effect the desired bending of the glass sheet.

5. Apparatus according to claim 4 including support means for said auxiliary array of shaping rail extensions; and means for imparting selective horizontal movement thereof relative to the outline shaping rail of said bending member.

6. Apparatus according to claim 5 wherein said means for imparting movement to said support means includes rack and pinion drive means.

7. Apparatus according to claim 6 wherein said drive means includes a fluid power actuator.

8. Apparatus according to claim 4 including adjustable means for mounting said shaping rail extensions to accommodate differing final shapes of the glass sheet.

9. Apparatus according to claim 8 wherein each of said rail extension includes pivotally mounted glass sheet engaging means.

10. Apparatus according to claim 5 wherein said support means includes adjustable means for mounting said shaping rail extensions to accommodate differing final shapes of the glass sheet.

11. Apparatus according to claim 4 including an upper bending member mounted for cooperative association with said movable bending member above said conveyor rolls.

12. Apparatus according to claim 11 wherein said upper bending member includes an outline shaping rail provided with a shaping surface conforming to the shaping rail of said movable bending member.

* * * * *